United States Patent
Bertran et al.

(10) Patent No.: US 9,804,849 B2
(45) Date of Patent: *Oct. 31, 2017

(54) SPACE REDUCTION IN PROCESSOR STRESSMARK GENERATION

(71) Applicant: International Business Machines Corporation, Armonk, NY (US)

(72) Inventors: Ramon Bertran, Bronx, NY (US); Pradip Bose, Yorktown Heights, NY (US); Alper Buyuktosunoglu, White Plains, NY (US); Timothy J. Slegel, Staatsburg, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/887,713

(22) Filed: Oct. 20, 2015

(65) Prior Publication Data
US 2017/0109169 A1    Apr. 20, 2017

(51) Int. Cl.
*G06F 9/30*    (2006.01)
*G06F 1/28*    (2006.01)
(Continued)

(52) U.S. Cl.
CPC ......... *G06F 9/30145* (2013.01); *G06F 1/28* (2013.01); *G06F 8/41* (2013.01); *G06F 9/30083* (2013.01); *G06F 9/30181* (2013.01); *G06F 11/36* (2013.01)

(58) Field of Classification Search
CPC ......... G06F 9/30145; G06F 9/30083; G06F 9/30181; G06F 11/3428; G06F 11/3024;
(Continued)

(56) References Cited

U.S. PATENT DOCUMENTS

| 6,408,428 B1 | 6/2002 | Schlansker et al. |
| 2002/0166112 A1* | 11/2002 | Martin ............... G06F 11/3447 717/124 |

(Continued)

FOREIGN PATENT DOCUMENTS

| WO | 2006114642 | 11/2006 |
| WO | 2007040793 | 4/2007 |
| WO | 2009100542 | 8/2009 |

OTHER PUBLICATIONS

List of IBM Patents or Patent Applications Treated as Related, Jan. 14, 2016, 2 pages.

(Continued)

*Primary Examiner* — Zahid Choudhury
*Assistant Examiner* — Aaron J Browne
(74) *Attorney, Agent, or Firm* — Cantor Colburn LLP

(57) ABSTRACT

An aspect includes pruning a design space when generating a maximum power stressmark. A multi-stage design space search process is performed. Each stage includes calculating a number of instructions per cycle (IPC) for each instruction sequence in a set of instruction sequences that place a power stress on a system under analysis, removing one or more of the instruction sequences having an IPC lower than a pruning threshold from the set, evaluating at least one power metric of the remaining instruction sequences in the set, removing one or more of the instruction sequences having at least one power metric evaluated outside of one or more pruning ranges from the set, and passing the remaining instruction sequences in the set to a next stage. A maximum power stressmark is generated based on the evaluating of the at least one power metric from a final stage.

13 Claims, 4 Drawing Sheets

(51) Int. Cl.
*G06F 11/36* (2006.01)
*G06F 9/45* (2006.01)

(58) Field of Classification Search
CPC .............. G06F 11/3466; G06F 11/3447; G06F 11/3433; G06F 2217/68
USPC .......... 702/182, 186; 713/300; 717/124, 131
See application file for complete search history.

(56) References Cited

U.S. PATENT DOCUMENTS

| | | | | |
|---|---|---|---|---|
| 2003/0037270 | A1* | 2/2003 | Venkitakrishnan | G06F 1/32 713/320 |
| 2010/0122105 | A1 | 5/2010 | Arslan et al. | |
| 2011/0093731 | A1* | 4/2011 | Parikh | G06F 11/24 713/340 |
| 2011/0295587 | A1 | 12/2011 | Eeckhout et al. | |
| 2011/0307688 | A1 | 12/2011 | Nurvitadhi et al. | |
| 2013/0246781 | A1* | 9/2013 | Qi | G06F 1/26 713/100 |

OTHER PUBLICATIONS

U.S. Appl. No. 14/953,722, filed Nov. 30, 2015, Entitled: Design Space Reduction in Processor Stressmark Generation, First Named Inventor: Ramon Bertran.

A. Joshi et al., "Automated Microprocessor Stressmark Generation," in Proc. of HPCA'08, pp. 229-239, Feb. 2008.

Bertran et al., "Voltage Noise in Multi-core Processors: Empirical Characterization and Optimization Opportunities," 2014 47th Annual IEEE/ACM International Symposium on Microarchitecture, Dec. 2014, 13 pages.

E. Safi, "Modeling and Optimization of Delay and Power for Key Components of Modern High-Performance Processors," PhD diss., University of Toronto, Jul. 2009, 117 pages.

J.H. Kelm, "Hybrid Coherence for Scalable Multicore Architectures," University of Illinois at Urbana-Champaign, Nov. 2010, 209 pages.

K. Ganesan et al., "MAximum Multicore POwer (MAMPO)—An Automatic Multithreaded Synthetic Power Virus Generation Framework for Multicore Systems," in Proc. of SC'11, pp. 1-12, Nov. 2011.

K. Ganesan et al., "SYstem-level Max POwer (SYMPO)—A Systematic Approach for Escalating System-level Power Consumptionusing Synthetic Benchmarks," in Proc. of PACT'10, pp. 19-28, Sep. 2010.

M. Ketlar et al., "A Microarchitecture-Based Framework for Pre- and Post-Silicon Power Delivery Analysis" in Proc. of MICRO'09, Dec. 2009, 7 pages.

R. Bertran et al., Systematic Energy Characterization of CMP/SMT Processor Systems via Automated Micro-Benchmarks, in MICRO '12, pp. 199-211, Dec. 2012.

S. Polfliet et al., "Automated Full-System Power Characterization," IEEE Micro, vol. 31, No. 3, pp. 46-59, May 2011.

Y. Kim et al., "AUDIT: Stress Testing the Automatic Way," in Proc. of MICRO'12, pp. 212-223, Dec. 2012.

Y. Kim et al., "Automated dl/dt Stressmark Generation for Microprocessor Power Delivery Networks," in Proc. of ISLPED'11, Aug. 2011, 6 pages.

\* cited by examiner

SPACE REDUCTION IN PROCESSOR STRESSMARK GENERATION

STATEMENT REGARDING FEDERALLY SPONSORED RESEARCH OR DEVELOPMENT

This invention was made with Government support under Contract No.: HR0011-13-C-0022 awarded by Defense Advanced Research Projects Agency (DARPA). The Government has certain rights in this invention.

BACKGROUND

The present application relates generally to computer system performance analysis. More specifically, the present application is directed to generation of processor stressmarks in a computer system through design space reduction.

In computer system design, understanding of energy behavior and microarchitecture characteristics early in a design process can enable designers to make packaging and power delivery decisions. Further optimizations to a design can be made to effectively manage heat and potential noise issues associated with different stressmarks. A stressmark refers to a condition or set of conditions that puts a desired type of stress on a system, such as a low power condition, a high power condition, a high inductive noise condition, and the like. For example, a particular instruction or sequence of instructions can result in a maximum condition for a metric of interest, a minimum for a metric of interest, or a maximum rate of change of a metric of interest.

When processor performance analysis is attempted manually, the process is typically tedious, time-consuming, and error-prone. Due to the vast number of configuration possibilities for a targeted processor, manual analysis is typically unable to fully explore a solution-space. Systems that apply a generic or brute-force approach to processor analysis are typically constrained by execution time due to the large number of possible configurations and permutations. Expert-defined design spaces can reduce processor analysis computational burden but typically require substantial manual intervention as well as substantial effort by experts to study the processor and configuration options in great detail.

SUMMARY

Embodiments relate to pruning a design space when generating a maximum power stressmark. One aspect is a method that includes performing a multi-stage design space search process. Each stage includes calculating a number of instructions per cycle (IPC) for each instruction sequence in a set of instruction sequences that place a power stress on a system under analysis, removing one or more of the instruction sequences having an IPC lower than a pruning threshold from the set, evaluating at least one power metric of the remaining instruction sequences in the set, removing one or more of the instruction sequences having at least one power metric evaluated outside of one or more pruning ranges from the set, and passing the remaining instruction sequences in the set to a next stage. A maximum power stressmark is generated based on evaluating at least one power metric from a final stage.

Embodiments include a computer system with a memory that includes a set of instruction sequences that place a power stress on a system under analysis. The computer system also includes a processor operably coupled to the memory and configured to perform a method. The method includes performing a multi-stage design space search process. Each stage includes calculating a number of IPC for each instruction sequence in the set, removing one or more of the instruction sequences having an IPC lower than a pruning threshold from the set, evaluating at least one power metric of the remaining instruction sequences in the set, removing one or more of the instruction sequences having at least one power metric evaluated outside of one or more pruning ranges from the set, and passing the remaining instruction sequences in the set to a next stage. A maximum power stressmark is generated based on evaluating at least one power metric from a final stage.

Embodiments also include a computer program product. The computer program product includes a computer readable storage medium having program instructions embodied therewith, the program instructions executable by a processor to cause the processor to perform a multi-stage design space search process. Each stage includes calculating an IPC for each instruction sequence in a set of instruction sequences that place a power stress on a system under analysis, removing one or more of the instruction sequences having an IPC lower than a pruning threshold from the set, evaluating at least one power metric of the remaining instruction sequences in the set, removing one or more of the instruction sequences having at least one power metric evaluated outside of one or more pruning ranges from the set, and passing the remaining instruction sequences in the set to a next stage. A maximum power stressmark is generated based on evaluating at least one power metric from a final stage.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments include systems, methods and computer program products for pruning a design space when generating a maximum power stressmark. A complete energy-wise and microarchitecture-wise taxonomy can be generated or may already be available for a targeted processor that includes instruction-wise power and instructions-per-cycle formalisms of each instruction present in an instruction set architecture. A configuration context can establish operating parameters and modes, such as a clock frequency, a number of cores that are active, and a level of multithreading. For each instruction, configuration context, and microarchitecture behavior, an instruction profile can be generated to collectively form an instruction set profile. Microarchitecture related information can be derived and used to define a reduced size design space on which a solution (such as max-power, min-power, voltage noise stressmarks) can be exhaustively searched in a practical amount of time.

In order to speed up the analysis process, pruning of the design space can be systematically performed at each stage of a multi-stage design space search process to generate a maximum power stressmark. The resulting sequence of instructions that is determined to generate a maximum power stressmark (i.e., a largest amount of power required from the set of instruction sequences and conditions tested) can be used for stress testing a system under analysis during a design and manufacturing process.

Figure 1:
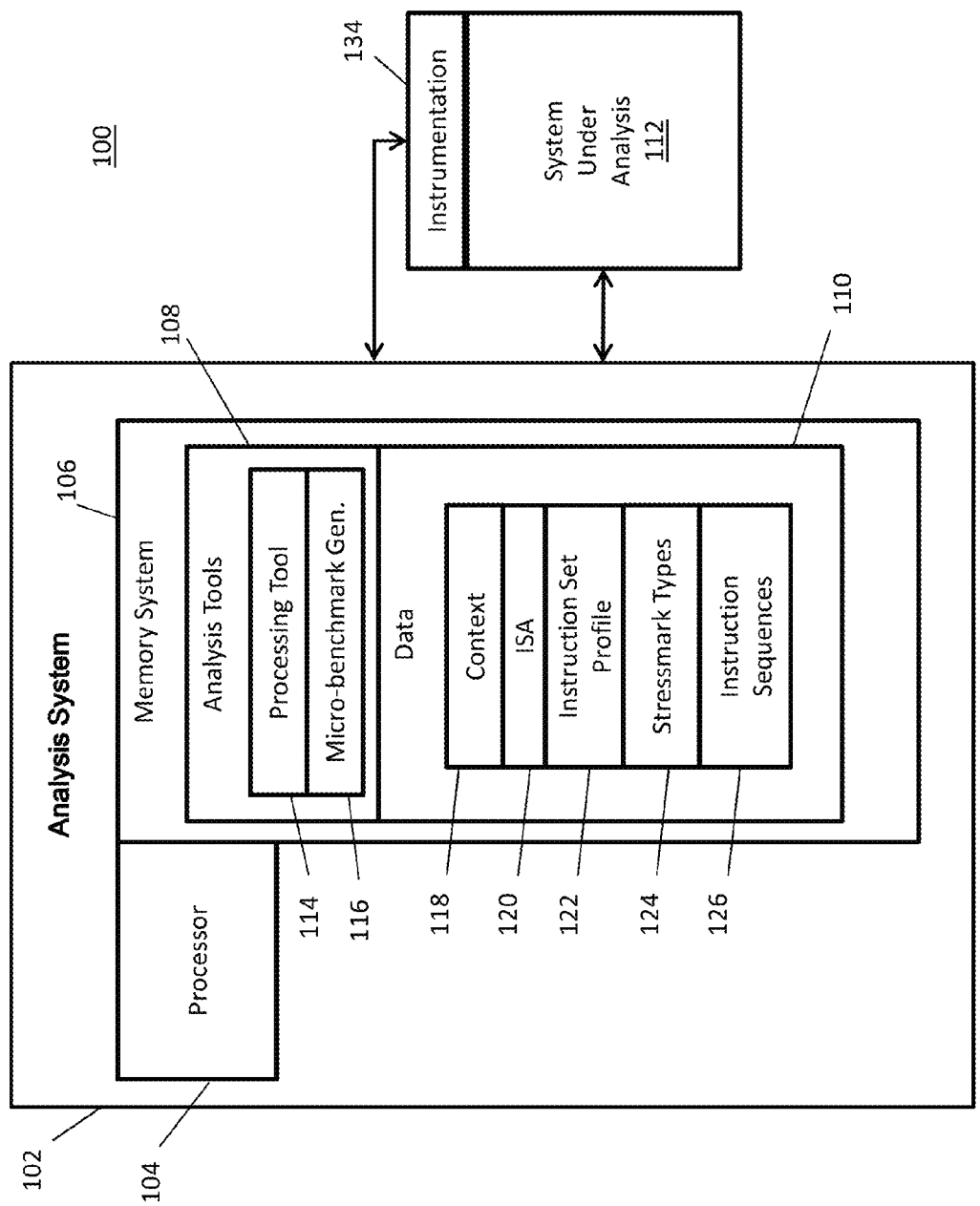
FIG. 1 is an exemplary diagram of an analysis system in which aspects of the exemplary embodiments may be implemented.
Figure 2:
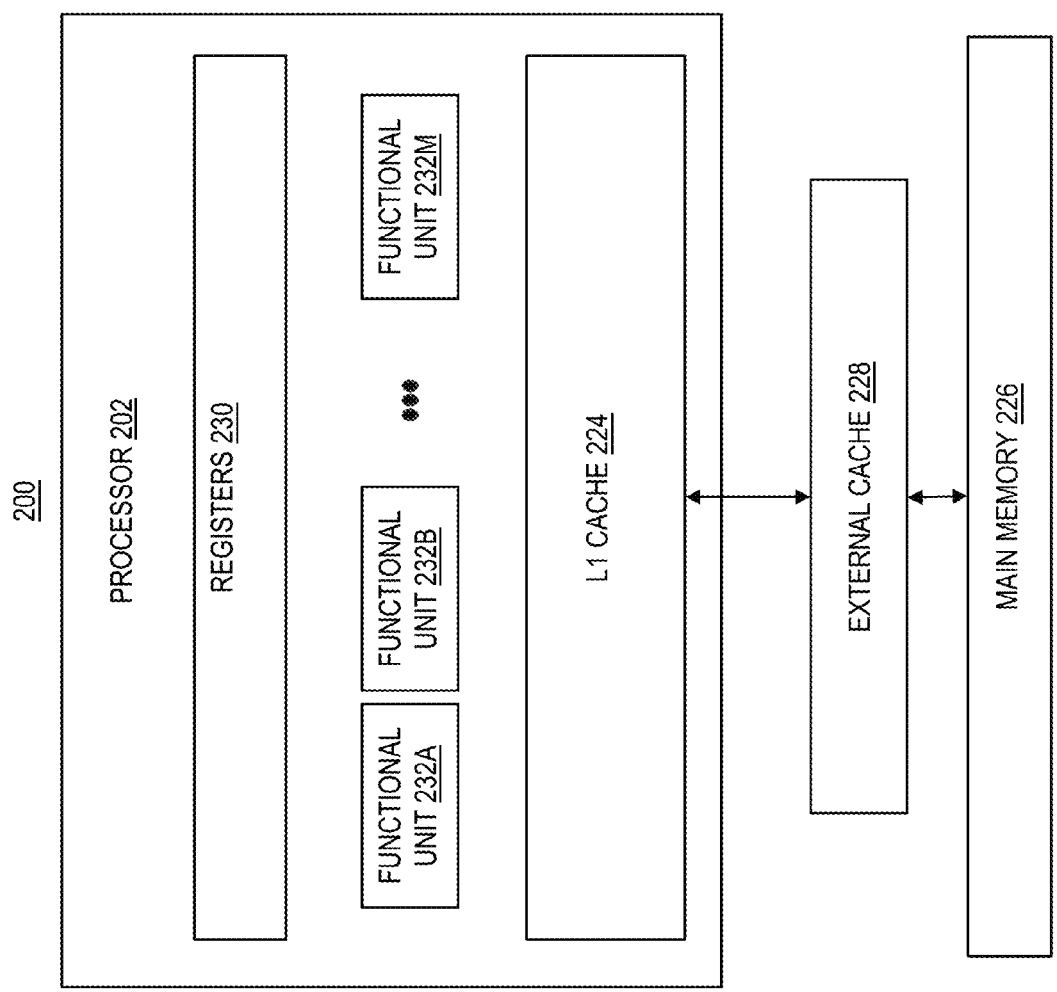
FIG. 2 is an exemplary block diagram of a system under analysis in accordance with an embodiment.

The exemplary embodiments may be implemented for a variety of processors of various computing devices. For example, exemplary embodiments may be used for any of a server computing device, client computing device, communication device, portable computing device, or the like. FIGS. 1-2 are provided hereafter as examples of an analysis system in which exemplary aspects of the illustrative embodiments may be implemented for a system under analysis. FIGS. 1-2 are only exemplary and are not intended to state or imply any limitation with regard to the types of computing devices in which the illustrative embodiments may be implemented. To the contrary, the exemplary embodiments may be implemented in any processor regardless of the particular machine or computing device in which the processor is ultimately operating.

Turning now to FIG. 1, a system 100 is generally shown that includes an analysis system 102 configured to generate processor stressmarks on a system under analysis 112 and prune a design space when generating a maximum power stressmark. The system under analysis 112 can be a physical system or a simulated system. For example, the system under analysis 112 may be in raw wafer form (that is, as a single wafer that has multiple unpackaged chips), as a bare die, or in a packaged form. In the latter case the system under analysis 112 can be mounted in a single chip package (such as a plastic carrier, with leads that are affixed to a motherboard or other higher level carrier) or in a multichip package (such as a ceramic carrier that has either or both surface interconnections or buried interconnections). The system under analysis 112 may also be integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor. FIG. 2 depicts one example of elements that may be incorporated within the system under analysis 112 regardless of physical packaging or level of physical realization.

Continuing with the description of FIG. 1, the analysis system 102 includes a processor 104 and a memory system 106 (also referred to as memory 106). The processor 104 can be any type of processing circuitry or microcontroller, including multiple instances thereof, that is configurable to execute processes further described herein, where the memory system 106 is an example of a tangible storage medium. The memory system 106 can include analysis tools 108 and data 110. The analysis tools 108 may be partitioned as one or more computer program products. For example, the analysis tools 108 can include a processing tool 114 and a micro-benchmark generator 116 among other executable applications (not depicted). The data 110 can include a variety of records, files, and databases, such as a configuration context 118, an instruction set architecture (ISA) 120, an instruction set profile 122, stressmark types 124, instruction sequences 126, and other data (not depicted) as further described herein.

In an exemplary embodiment, the processor 104 is coupled to the memory system 106, and the processor 104 is configured to execute the analysis tools 108 to analyze the ISA 120 of the system under analysis 112 and generate the instruction set profile 122 for each instruction of the ISA 120. The system under analysis 112 can include at least one processor that is targeted by analysis at the processor or core level to determine a combination of instruction sequences 126 for a targeted processor of the system under analysis 112 from the instruction set profile 122 that corresponds to a desired stressmark type of the stressmark types 124. The desired stressmark type can define a metric representative of functionality of interest of the targeted processor.

The processing tool 114 may orchestrate an analysis process as well as perform pre and post processing operations on data generated by the micro-benchmark generator 116. The micro-benchmark generator 116 can develop benchmark data on a variety of performance metrics and on an instruction basis for an instruction or sequence of instructions. The micro-benchmark generator 116 may operate in a simulation environment that is configured with architecture and performance characteristics of the system under analysis 112 or may directly interface with a physical instance of the system under analysis 112 using instrumentation 134. The instrumentation 134 can include current monitors, voltage monitors, temperature monitors, noise level monitors, and the like.

The system under analysis 112 can be a multi-core computer system that is targeted for performance analysis, such as one or more multi-core and multi-threading processors. The results of stressmark analysis for metrics such as power, energy, temperature, instructions-per-cycle, etc. can be used to identify which instruction sequences 126 or combinations of the instruction sequences 126 should be stored for use in further testing, analysis, and/or development applications. The processing tools 114 can execute one or more scripts to perform a multi-stage design space search process and prune the design space at multiple stages to generate a desired stressmark in a reduced period of time. Further details are provided herein.

FIG. 2 depicts an example of a processing system 200 according to an embodiment of the system under analysis 112 of FIG. 1 as a targeted computer system. The processing system 200 may be a simultaneous multithreading (SMT) multicore processing system, non-SMT processing system, or other processing system configuration known in the art. The processing system 200 of FIG. 2 is illustrated with a single instance of a targeted processor 202; however, it will be understood that the processing system 200 can include multiple processors with one or more processing cores (not depicted). The targeted processor 202 may have an instruction cache for caching instructions from memory to be executed and a data cache for caching data (operands) of memory locations to be operated on, which are depicted generally as L1 cache 224 as part of a hierarchical cache structure. The targeted processor 202 may employ an external cache 228 between the targeted processor 202 and main memory 226.

It is understood that the targeted processor 202 is a physical device or simulated instance thereof that includes all the circuitry (i.e., hardware along with firmware) necessary to execute instructions as understood by one skilled in the art. For example, the targeted processor includes registers 230 for storing small amounts of data, status, and configuration information.

The targeted processor 202 may execute one or more threads (not depicted) simultaneously, where each thread is a separate sequence of instructions or instruction stream, such as a program or portion thereof that can be provided from the instruction sequences 126 of FIG. 1. The instruction sequences 126 of FIG. 1 can include one or more instructions classes, such as: general, decimal, floating-point-support (FPS), binary-floating-point (BFP), decimal-floating-point (DFP), hexadecimal-floating-point (HFP), control, and I/O instructions. The general instructions can be used in performing binary-integer arithmetic operations and logical, branching, and other non-arithmetic operations. The decimal instructions operate on data in decimal format. The BFP, DFP, and HFP instructions operate on data in BFP, DFP, and HFP formats, respectively, while the FPS instructions operate on floating-point data independent of the format or convert from one format to another. To achieve higher throughput, various resource units, such as functional units 232A, 232B, . . . , 232M of the targeted processor 202 can be accessed in parallel by executing one or more of the instructions in the instruction sequences 126 of FIG. 1 using a processing pipeline and micro-operation sequencing. Functional units 232A-232M can include, for example, one or more fixed-point execution units, floating-point execution units, vector execution units, load/store units, branch control units, and the like.

Figure 3:
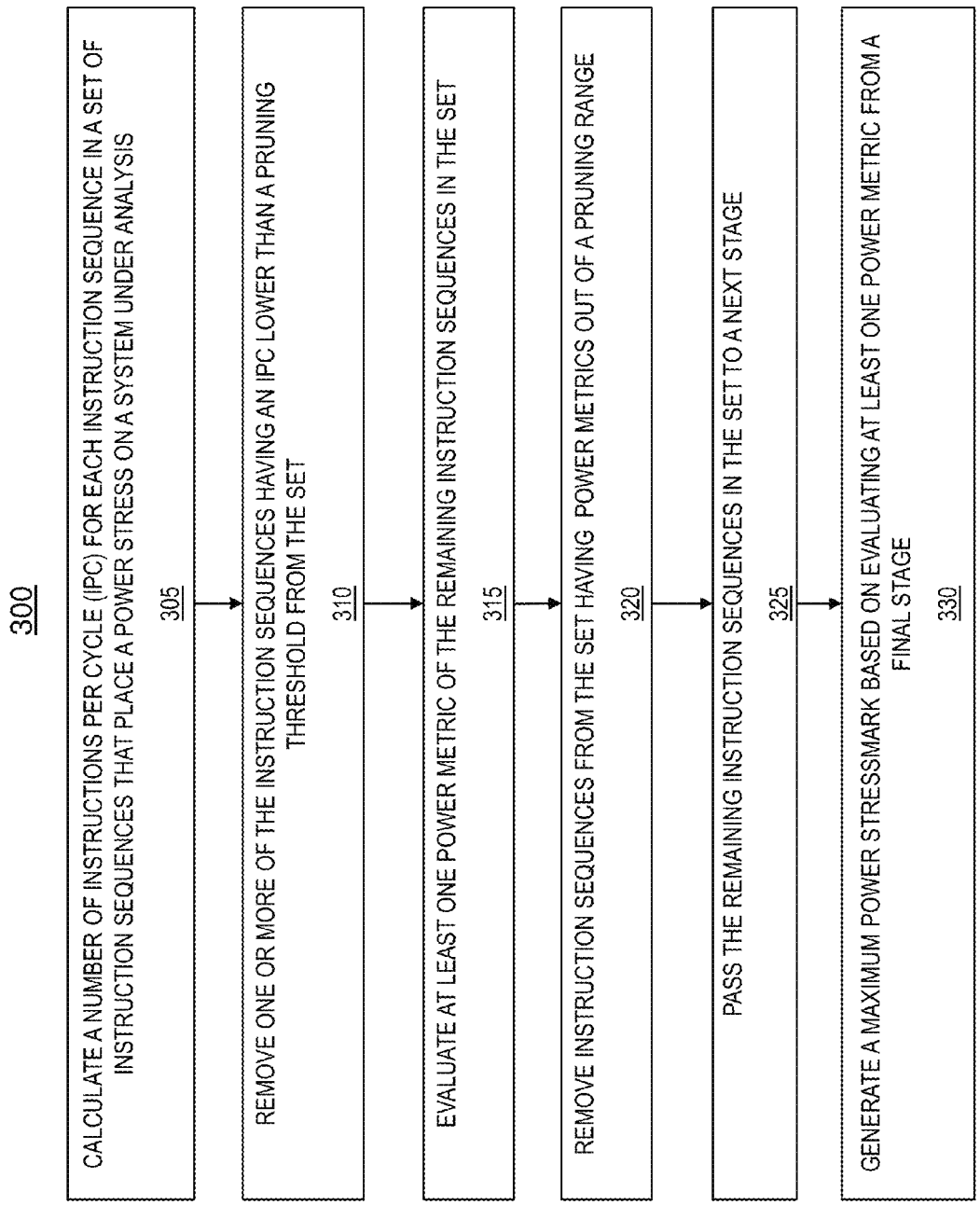
FIG. 3 illustrates a flow diagram of a method for pruning a design space in accordance with an exemplary embodiment.

Referring now to FIG. 3, a flow chart diagram of a method 300 for pruning a design space in accordance with an exemplary embodiment is shown. The example of FIG. 3 is described with respect to the examples of FIGS. 1 and 2. The method 300 performs a multi-stage design space search process. The method 300 may be performed by the analysis tools 108 of FIG. 1, which can include the processing tool 114 making calls to the micro-benchmark generator 116 and evaluating the results. The method 300 can use any of the data 110 of FIG. 1 in performing analysis with respect to the system under analysis 112 of FIG. 1. As shown at block 305, the method 300 includes calculating a number of instructions per cycle (IPC) for each instruction sequence in a set of instruction sequences 126 that place a power stress on the system under analysis 112. At block 310, one or more of the instruction sequences are removed that have an IPC lower than a pruning threshold from the set of instruction sequences 126, e.g., select top N instruction sequences. At block 315, at least one power metric of the remaining instruction sequences in the set of instruction sequences 126 is evaluated. At block 320, one or more of the instruction sequences are removed that have the power metrics evaluated outside of one or more pruning ranges from the set of instruction sequences 126, e.g., select top N instruction sequences with the highest power. At block 325, the remaining instruction sequences in the set of instruction sequences 126 are passed to a next stage. At block 330, a maximum power stressmark is generated based on evaluating at least one power metric from a final stage. Examples of pre-processing to determine members of the set of instruction sequences 126 and the stages are further detailed herein with respect to FIG. 4.

Figure 4:
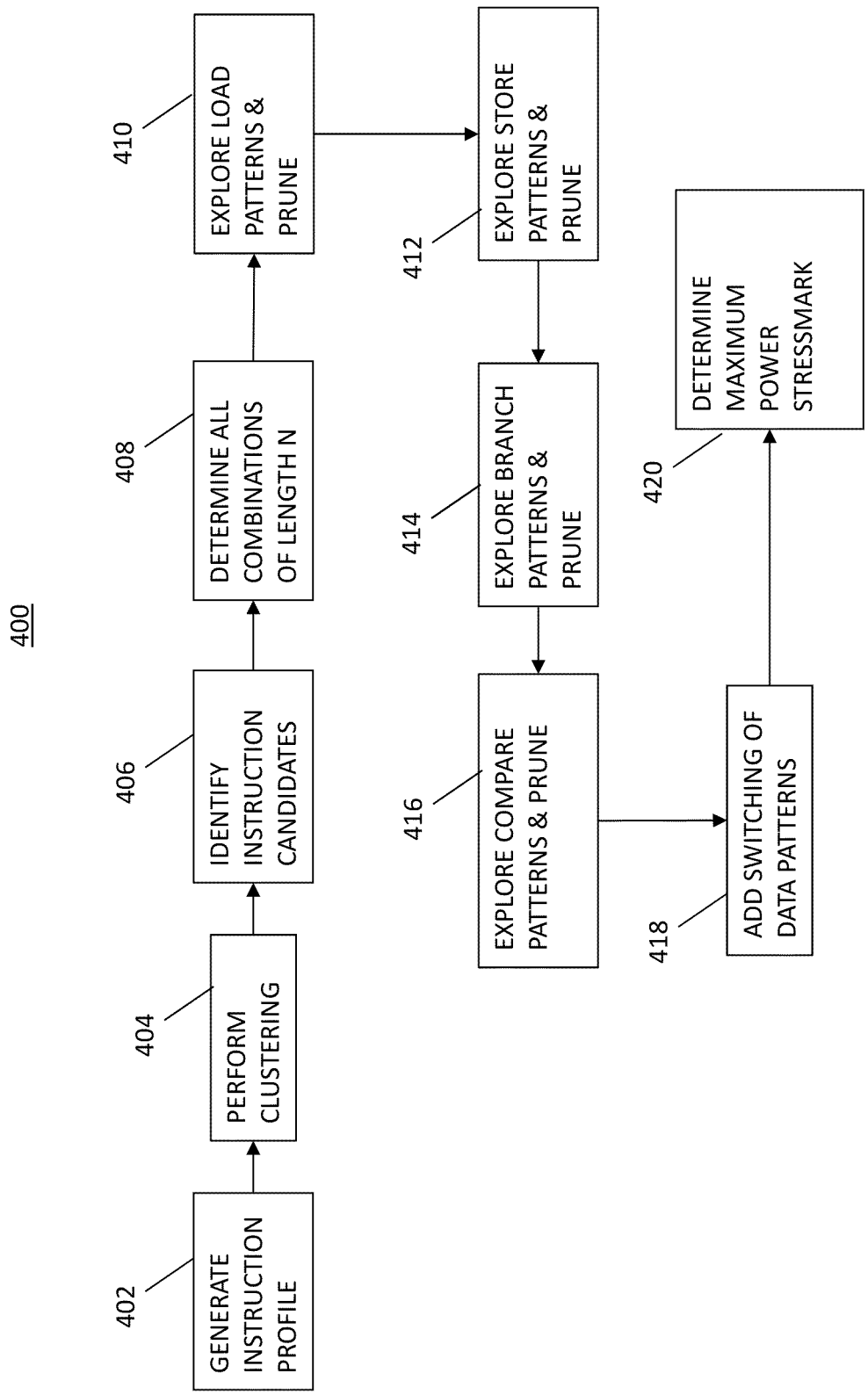
FIG. 4 illustrates another flow diagram of a method for pruning a design space in accordance with an exemplary embodiment.

Referring now to FIG. 4, a flow chart diagram of a method 400 for pruning a design space in accordance with an exemplary embodiment is shown. The example of FIG. 4 is described with respect to the examples of FIGS. 1-3. At block 402, an instruction profile is generated. For example, the processor 104 of the analysis system 102 of FIG. 1 may initially analyze the ISA 120 FIG. 1 of a targeted processor, such as the targeted processor 202 of FIG. 2, to generate the instruction set profile 122 of FIG. 1 for each instruction of the ISA 120. The instruction set profile 122 can be formed based on a microarchitecture behavior and the configuration context 118 of the targeted processor. For instance, the targeted processor 202 may have a reduced instruction set computer (RISC) or a complex instruction set computer (CISC) architecture with a predetermined or modeled microarchitecture behavior that may respond differently depending upon the configuration context 118, e.g., clock frequency, multi-threading enabled, branch prediction enabled, etc. As one example, there may be about 1000 instructions to profile. The properties in the instruction set profile 122 can be generated by the micro-benchmark generator 116 of FIG. 1. For instances of the targeted processor 202 that support multithreading, instructions can be grouped in an instruction group tied to a corresponding thread and may have dependencies on other instructions that impact efficiency depending upon sequencing. Additionally, instructions-per-cycle and group formation metrics can be impacted when faster instructions are grouped with slower instructions. Multi-core parallel operations with cross-core interfacing may also be supported, e.g., multiple instances of the instruction sequences simultaneously executing in separate cores in parallel.

At block 404, clustering of instructions is performed. The clustering of instructions for analysis may be performed to categorize the instructions based on power, performance, architecture and microarchitecture metrics such as functional unit 232A-232M of the system under analysis 112 invoked by each of the instructions. For example, instructions that use a floating-point unit can be separately categorized from instructions of a load-store unit or branch unit.

At block 406, instruction candidates are identified. The instruction candidates can be selected from the clustering of the instructions based on having a higher power metric for each category of the instructions. For instance, a power metric can be used to rank/sort the instructions for each functional unit 232A-232M of the system under analysis 112.

At block 408, all combinations of length N including the instruction candidates are determined. The set of instruction sequences can be generated as a plurality of combinations of the instruction candidates limited to a maximum instruction sequence length. As one example, if four instruction candidates are identified, all combinations of the four instruction candidates (i.e., 4^N combinations) would be used as the initial values of the set of instruction sequences 126.

At block 410, load patterns are explored and pruned. Block 410 can include a stage of exploring load patterns that distribute combinations of load instructions in the set comprising a combination of different numbers of streams, different sizes of streams, and different stride sizes. This covers a variety of address ranges, address access patterns, and size of accesses. Load pattern exploration and pruning can include performing blocks 305-325 of method 300 of FIG. 3 with respect to load patterns as a first stage of a multi-stage design space search process.

At block 412, store patterns are explored and pruned. A store patterns stage can distribute combinations of store instructions in the set including a combination of different numbers of streams, different sizes of streams, and different stride sizes. This covers a variety of address ranges, address access patterns, and size of accesses. Store patterns can be mixed with load patterns by partially overwriting load instructions from block 410 to establish various load/store ratios. Store pattern exploration and pruning can include performing blocks 305-325 of method 300 of FIG. 3 with respect to store patterns as a second stage of a multi-stage design space search process.

At block 414, branch patterns are explored and pruned. An explore branch patterns stage can add branch instructions at a predetermined branch placement interval and take the branch instructions at a predetermined branch taken interval. Whether a branch is taken or not can impact performance. The use of a branch predictor can also impact performance. Branch pattern exploration and pruning can include performing blocks 305-325 of method 300 of FIG. 3 with respect to branch patterns as a third stage of a multi-stage design space search process.

At block 416, compare instruction patterns are explored and pruned. The compare patterns stage can add compare instructions at a predetermined compare interval. Compare instruction pattern exploration and pruning can include performing blocks 305-325 of method 300 of FIG. 3 with respect to patterns of compare instructions as a fourth stage of a multi-stage design space search process.

At block 418, switching of data patterns can be added. The switching of data values in various patterns can be added after the fourth (final) stage and prior to generating the maximum power stressmark. Switching factors can include the effect of switching inputs and/or outputs at a lower rate, at a higher rate, and/or at a random frequency. Selection of particular inputs, outputs, and combinations thereof as operands can also impact performance, e.g., multiple accesses to a shared resource. As one example switching can include alternating between data bit patterns of all ones and all zeroes at different rates.

At block 420, a maximum power stressmark is determined. Performance of the targeted processor 202 can be monitored with respect to the desired stressmark type while executing each of the instruction sequences 126 after modifications and pruning in blocks 410-418 has been performed. For example, the micro-benchmark generator 116 of FIG. 1 can use the instrumentation 134 of FIG. 1 to monitor the targeted processor 202 of FIG. 2 while executing the instruction sequences 126. Although the example of FIG. 4 is described with respect to a maximum power stressmark, a similar sequence of multi-stage design space exploration and reduction can be performed for other stressmark types 124 including, for instance, one or more of: a minimum power metric, a noise metric, an energy metric, a speed metric, or other metric type.

IPC can be used as a metric for ranking and pruning results in blocks 410-418 according to the instruction set profile 122 of FIG. 1. A highest ranking group of the instruction sequences 126 of FIG. 1 can be selected as output from one stage and as input to the next stage of blocks 410-418 with respect to the desired stressmark type. In one embodiment, the ranking and pruning may include determining a weighted combination of the instruction-per-cycle metric and the energy-per-instruction metric to form a consolidated energy behavior metric for each instruction sequence under evaluation in blocks 410-418. Further, selection of one or more instructions for the instruction sequences 126 of FIG. 1 can be based on the consolidated energy behavior metric and a classification based on the mapping to functional units 232A-232M of FIG. 2 of the targeted processor 202 can be performed as part of blocks 402-406.

Technical effects and benefits include pruning a design space when generating a maximum power stressmark in a processing system. Instruction sequences that produce desired stressmarks can be determined analytically such that the performance of a system under analysis can be better understood at the processor or system level. By systematically pruning results produced through a sequence of stages, the total processing time required to generate a maximum power stressmark can be reduced.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:
1. A computer system comprising:
a memory comprising a set of instruction sequences that place a power stress on a system under analysis; and
a processor operably coupled to the memory and configured to perform a method comprising:
performing a multi-stage design space search process, wherein each stage comprises:
calculating a number of instructions per cycle (IPC) for each instruction sequence in the set;
removing one or more of the instruction sequences having an IPC lower than a threshold from the set to retain a plurality of the instruction sequences having the IPC above the threshold as a plurality of remaining instruction sequences in the set;
evaluating at least one power metric of the remaining instruction sequences in the set;
removing one or more of the instruction sequences from the remaining instruction sequences having at least one power metric evaluated outside of one or more ranges from the set to further prune the remaining instruction sequences based on power; and passing the remaining instruction sequences in the set to a next stage; and generating a maximum power stressmark based on the evaluating of the at least one power metric from a final stage; and executing the remaining instruction sequences to stress test a system under analysis during a design and manufacturing process to reduce processor analysis computational burden on the system.

2. The computer system of claim 1, wherein the processor is further configured to perform:

clustering a plurality of instructions for analysis to categorize the instructions based on a functional unit of the system under analysis invoked by each of the instructions;

selecting a plurality of instruction candidates from the clustering of the instructions based on having a higher power metric for each category of the instructions; and generating the set of instruction sequences as a plurality of combinations of the instruction candidates limited to a maximum instruction sequence length.

3. The computer system of claim 1, wherein at least one stage comprises an explore load patterns stage that distributes combinations of load instructions in the set comprising a combination of different numbers of streams and different sizes of streams.

4. The computer system of claim 3, wherein at least one stage comprises an explore store patterns stage that distributes combinations of store instructions in the set comprising a combination of different numbers of streams and different sizes of streams.

5. The computer system of claim 1, wherein at least one stage comprises an explore branch patterns stage that adds branch instructions at a predetermined branch placement interval and takes the branch instructions at a predetermined branch taken interval.

6. The computer system of claim 1, wherein at least one stage comprises an explore compare patterns stage that adds compare instructions at a predetermined compare interval.

7. The computer system of claim 1, wherein the processor is further configured to perform:

adding switching of data values after the final stage and prior to generating the maximum power stressmark.

8. A computer program product for pruning a design space when generating a maximum power stressmark, the computer program product comprising a non-transitory computer readable storage medium having program instructions embodied therewith, the program instructions executable by a processor to cause the processor to:

perform a multi-stage design space search process, wherein each stage comprises:

calculating a number of instructions per cycle (IPC) for each instruction sequence in a set of instruction sequences that place a power stress on a system under analysis;

removing one or more of the instruction sequences having an IPC lower than a threshold from the set to retain a plurality of the instruction sequences having the IPC above the threshold as a plurality of remaining instruction sequences in the set;

evaluating at least one power metric of the remaining instruction sequences in the set;

removing one or more of the instruction sequences from the remaining instruction sequences having at least one power metric evaluated outside of one or more ranges from the set to further prune the remaining instruction sequences based on power; and passing the remaining instruction sequences in the set to a next stage; and generate a maximum power stressmark based on the evaluating of the at least one power metric from a final stage; and executing the remaining instruction sequences to stress test a system under analysis during a design and manufacturing process to reduce processor analysis computational burden on the system.

9. The computer program product of claim 8, wherein the program instructions cause the processor to:

cluster a plurality of instructions for analysis to categorize the instructions based on a functional unit of the system under analysis invoked by each of the instructions;

select a plurality of instruction candidates from the clustering of the instructions based on having a higher power metric for each category of the instructions; and generate the set of instruction sequences as a plurality of combinations of the instruction candidates limited to a maximum instruction sequence length.

10. The computer program product of claim 8, wherein at least one stage comprises an explore load patterns stage that distributes combinations of load instructions in the set comprising a combination of different numbers of streams and different sizes of streams; and at least one stage comprises an explore store patterns stage that distributes combinations of store instructions in the set comprising a combination of different numbers of streams and different sizes of streams.

11. The computer program product of claim 10, wherein at least one stage comprises an explore branch patterns stage that adds branch instructions at a predetermined branch placement interval and takes the branch instructions at a predetermined branch taken interval, at least one stage comprises an explore compare patterns stage that adds compare instructions at a predetermined compare interval, and switching of data values is added after the final stage and prior to generating the maximum power stressmark.

12. The computer system of claim 1, wherein the processor is further configured to perform:

determining a weighted combination of the IPC and an energy-per-instruction metric as a consolidated energy behavior metric for each of the instruction sequences; and performing ranking and pruning of the instruction sequences based on the consolidated energy behavior metric.

13. The computer program product of claim 8, wherein the program instructions cause the processor to:

determine a weighted combination of the IPC and an energy-per-instruction metric as a consolidated energy behavior metric for each of the instruction sequences; and perform ranking and pruning of the instruction sequences based on the consolidated energy behavior metric.

* * * * *